US010733546B2

(12) United States Patent
Pilkington et al.

(10) Patent No.: US 10,733,546 B2
(45) Date of Patent: Aug. 4, 2020

(54) AUTOMATED USER INTERFACE GENERATION FOR PROCESS TRACKING (71) Applicant: Experian Health, Inc., Franklin, TN (US)

(72) Inventors: Edmond Chase Pilkington, Rockvale, TN (US); David Stephen Phoebus, Nashville, TN (US); Aniss Driss, Chicago, IL (US); Julie F. Radtke, Mount Prospect, IL (US); Keith Daniel Wenzler, Thompson's Station, TN (US); Michael Ryan Kirton, Spring Hill, TN (US)

(73) Assignee: EXPERIAN HEALTH, INC., Franklin, TN (US)

( * ) Notice: Subject to any disclaimer, the term of this patent is extended or adjusted under 35 U.S.C. 154(b) by 517 days.

(21) Appl. No.: 15/085,802

(22) Filed: Mar. 30, 2016

(65) Prior Publication Data
US 2017/0285879 A1 Oct. 5, 2017

(51) Int. Cl.
G06Q 10/06 (2012.01)
G06F 3/0481 (2013.01)
H04L 29/08 (2006.01)
G06F 3/0484 (2013.01)
G06F 40/174 (2020.01)

(52) U.S. Cl.
CPC ..... G06Q 10/06311 (2013.01); G06F 3/0481 (2013.01); G06F 3/0484 (2013.01); G06F 40/174 (2020.01); G06Q 10/06316 (2013.01); G06Q 10/063114 (2013.01); H04L 67/10 (2013.01); H04L 67/22 (2013.01)

(58) Field of Classification Search
CPC ...... G06F 3/048; G06F 40/174; G06F 3/0484; G06Q 10/06; G06Q 10/06313; G06Q 10/06311; G06Q 10/063114; G06Q 10/06316
See application file for complete search history.

(56) References Cited

U.S. PATENT DOCUMENTS

2008/0249816 A1* 10/2008 Khalilian ............... G06Q 10/06
705/7.15
2013/0211866 A1* 8/2013 Gordon .................. G06Q 10/00
705/7.15
2014/0006275 A1* 1/2014 Hanson .................. G06Q 40/02
705/41

(Continued)

Primary Examiner — Nicholas Ulrich
(74) Attorney, Agent, or Firm — Merchant & Gould (57) ABSTRACT Tracking the process of a client activity via an electronic system involves the provision of user interfaces by which data are communicated to user. Optimizing the generation of these user interfaces in a cloud-based system reduces processing resources required by the cloud-based portion, improves the user experience on the local portions, and improves the data collected by users. Using, as described herein, historical data known to the cloud-based portion related to both the user and the client, the user interfaces are updated to show progress of the activity and to organize the tasks for the given user in an optimal arrangement. Reports may also be generated regarding the efficacy of the users in shepherding the activity to completion in a more efficient manner. Various user interface elements are integrated into the cloud-based system for quick provision of activity and task statuses to the user.

20 Claims, 7 Drawing Sheets (56) References Cited

U.S. PATENT DOCUMENTS

2015/0317073 A1* 11/2015 Hull .................. H04W 4/21
                                                    715/753
2016/0019484 A1* 1/2016 Srivastava ....... G06Q 10/06313
                                                    705/7.17
2017/0193349 A1* 7/2017 Jothilingam ........... G06N 3/006

* cited by examiner

FIG. 1

Upjohn, Emily — 201

ACCT #: 001002003004-1234  Birth 01/01/1900
MRN: 9876543321abc  Service 01/01/2020

Status: Done  Comments

PREV  NEXT

| OVERVIEW | DEMOGRAPHICS | COVERAGE | PRE-CERTIFICATION | CHARITY | ESTIMATE | TRIAGE | COLLECTION | PT PORTAL |

— 210 (OVERVIEW tab)
— 220
— 230

ACCOUNT SUMMARY

Demographics  Coverage  Encounter

Client Information

| | |
|---|---|
| Name: | Emily Upjohn |
| Address: | 4567 Pine Circ |
| | Anytown, FL 33111 |
| Home Phone: | (786) 555-1234 |
| Cell Phone: | None |
| Email Address: | None |
| Date of Birth: | Jan 1, 1900 |
| Sex: | F |
| SSN: | 987-65-4321 |

Guarantor Information

---

Address Verification — View Details — 240a
Address Found

Notice of Admission — View Details — 240b
☐  Not Run

Submit Referral — View Details — 240c
Not Run

| Status | Task | Last Updated | Operator |
|---|---|---|---|
| ⚙ | Orders | 01/01/2020 0900:33 | L. Ratched |
| ✓ | Verify Address | 01/01/2020 1031:45 | L. Ratched |
| ! | Submit Referral | ---- | ---- |

McMurphy, Randle
Acct #: 0050006007008-5678
MRN: 123456789xyz
DOS: 01/01/2020
[✓] Done

| Status | Task | Last Updated | Operator |
|---|---|---|---|
| ⚙ | Orders | 01/01/2020 0900:33 | L. Ratched |
| ✓ | Verify Address | 01/01/2020 1031:45 | C. Diesel |
| ! | Submit Referral | ---- | ---- |

Upjohn, Emily
Acct #: 0010002003004-1234
MRN: 987654321abc
DOS: 01/01/2020
[✓] Done

AUTOMATED USER INTERFACE GENERATION FOR PROCESS TRACKING

BACKGROUND

Institutions that track clients throughout the process of a client activity often rely on employees to manually input data as the client is tracked through the activity. Clients and employees, being human however, are prone to error when providing or entering data. For example, a client may misstate a home address or the employee may mis-enter that address into a record keeping system or enter it into the wrong input box in the record keeping system. Providing machine readable codes (e.g., a one- or two-dimensional barcode, radio frequency identifiers (RFID), or microchips) may help alleviate mis-provision and mis-entry, although it is not infallible, as machine reading errors can still occur and the data are still prone to non-entry, for example, when the employee forgets to ask for information. When data are improperly or not entered, sub-processes comprising a process may be left incomplete, which will increase the difficulty in completing the process or prevent conditional sub-processes from being correctly included/excluded from the process, especially when the client is no longer available to provide the data. For example, if the employee fails to input client address information, follow up communications with the client (e.g., test results, billing, future marketing) may be impossible to complete.

Institutions wish to both monitor the ability of employees to fulfill the requirements of process tracking after the fact, and to monitor the process in real-time to prevent errors from occurring or to prompt the employees to fix the errors before problems develop from those errors. The auditing (during or post-procedure) process when automated, however, is often processor intensive and transmission heavy; requiring large amounts of data to be passed back and forth between systems and multiple calls to databases to verify that the data have been properly entered.

BRIEF SUMMARY

The present disclosure provides systems and methods for improving the functionality of systems used for generating customized user interfaces for tracking client activities within an institution. By customizing the user interfaces for process tracking according to the present disclosure, a more efficient automated auditing process (both during and post-procedure) and a better user experience for manual entry of process steps are provided.

In the use case of tracking a process during the activity, as data are entered, they are sent to a repository (such as a database), and a user interface is generated (or updated) to contain the information related to the client and the status of tasks comprising the procedures. Historic data are also used from the repository to error check input data as data entry occurs and customize the user interface, based on historical user data, to better guide the user through the tasks of the activity.

In the use case of determining how a user has performed historically regarding process tracking (relating to manual entry of data and the requesting thereof), the status of tasks comprising client activities that a given operator has entered data for are aggregated on a per-operator basis. By aggregating historical data on a per-user basis, the institution is enabled to identify best practices, the need for additional training or safeguards, and inconsistencies in its data, and the system is able to customize the user interface for the given user, based on the historical user data.

In both use cases, the process tracker uses historic data in conjunction with newly entered data and processing already being run by a cloud-based system to improve the auditing process to use fewer computing resources. Aspects of systems and methods described herein may be practiced in hardware implementations, software implementations, and in combined hardware/software implementation. This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the present invention. In the drawings.

DETAILED DESCRIPTION

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Figure 1:
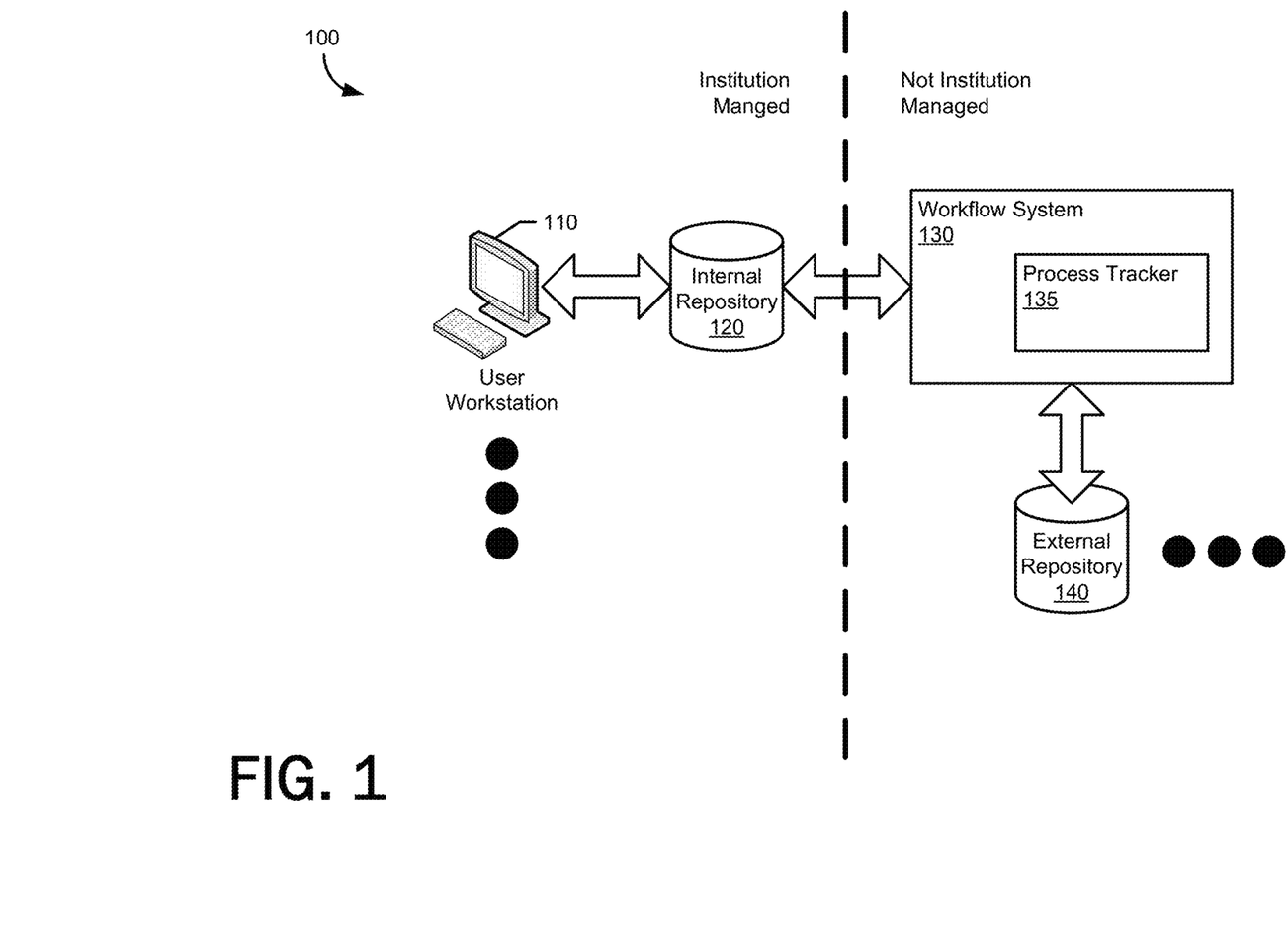
FIG. 1 is a block diagram illustrating an example environment in which a process tracker may be implemented.

FIG. 1 is a block diagram illustrating an example environment 100 in which a process tracker 135 may be implemented. In the example environment 100, the components managed by the institution include one or more user workstation(s) 110 in communication with an internal repository 120, which in turn is in communication with the components managed outside of the institution. The components managed outside of the institution (e.g., a cloud-based system) include a workflow system 130, which includes the process tracker 135, and one or more external repository(ies) 140, which may be managed by the party that manages the workflow system 130 or by a third party.

In various aspects, the user workstations 110 are implemented as various computing devices that are used by users at the institution to enter client data, to track and view the client as activities and services are proved to the client. Such computing devices include, but are not limited to: desktop computers, laptop computers, tablets, smart phones, personal digital assistants (PDAs), and the like, which may be shared by multiple operators or specific to a given operator. The components of computing devices are discussed in greater detail in regard to FIG. 5.

The internal repository 120 is representative of a central server, or other computing device, that provides centralized management of records within the institution, such as, for example, a Document Management System (DMS), a Hospital Information System (HIS), or an inventory/customer management database. The internal repository 120 may be communicated with the user workstations 110 via direct data links or a network, such as for example, a Local Area Network (LAN) or a distributed network (e.g., the Internet or a Virtual Private Network (VPN) via the Internet). In various aspects, the internal repository 120 may be omitted, or the user workstations 110 may communicate with the internal repository 120 in parallel to communicating with the workflow system 130 managed externally from the institution instead of communicating with the workflow system 130 serially via the internal repository 120 as illustrated.

The workflow system 130 is illustrative of a computer system external to the institution (i.e., managed by a different party) that provides data processing services to the institution. Institutions use data processing services to receive Software as a Service (SaaS), via a thin client (e.g., a web browser) on the user workstations 110 (allowing for inexpensive computing devices to be used as terminals and reduced infrastructure to be maintained by the institution) and to employ the provider's expertise in various areas (e.g., information security, payment processing, regulatory navigation, hardware maintenance) for which the institution lacks operational capabilities or expertise. By outsourcing data processing services related to workflow management to the workflow system 130, historic data held by different institutions (optionally) and the provider can be fed back into the services rendered to the first institution without the need to retransmit those data or to process those data multiple times, thus improving the efficiency of the institution's systems and the provider's systems.

As data are input by a user and transmitted to the workflow system 130 for processing, the processing results and historic data related to the inputted data are used to update the user interfaces (UI) that are transmitted for display on the user workstation 110. In one example, after inputting a client's address, the workflow system 130 will run an address verification check (determining whether the address exists and whether historic data verify that the client resides at that address) and a UI will be updated to include the result of that verification check (pass, fail, user attention required, etc.) and, additionally or alternatively, the UI will be updated to include controls for the next data to be input by the operator.

The process tracker 135, as a part of the workflow system 130, improves the auditing and process tracking capabilities, and efficiencies thereof, of the workflow system 130, and by extension the institution's systems. By providing the controls for inputting additional data in the UIs and additional dialogs and displays, the tasks that comprise a procedure are tracked for the responsible users, and the procedure tracking process is guided by the process tracker 135. For example, an institution may look up how a user has performed historically regarding process tracking via the UI elements added throughout the client activity and whether the data entered match historic data known to the workflow system 130. In another example, using historic data, the process tracker 135 will select the tasks that comprise a procedure to presentation in the UI in an order that is influenced by the historic performance of the user.

To illustrate, consider an institution that has frequently requested emergency contact information for client, but the users have not supplied such information to the workflow system 130 for a variety of reasons (forgetfulness, the client not supplying the information, etc.). The process tracker 135 is operable to rearrange the UI, asking more prominently for the contact information to be input (to reduce user forgetfulness). For example, completed tasks may be moved to a bottom of a UI to show tasks still requiring user input in a higher position in the UI, or historically skipped tasks (within the institution or specific to the user) may be presented with larger controls or earlier in a list of tasks (or via modal dialogs when the controls are normally non-modal). Similarly, potential tasks may be hidden until the inputted or historical data indicate that the potential tasks are actually part of the procedure. For example, contact information for a guardian of the client may be optionally requested when the client is a minor (e.g., shown by inputted data of a birth date) or known by historic data to have a guardian. For example, a client with dementia may be recalled as having a guardian based on inputted identifiers (e.g., name, social security number (SSN), client number) that match historic data which include records of client activities that include guardian information. A percentage of tasks comprising a procedure may also be inserted into the UI to show that some data have not been successfully inputted, and a relative quantity thereof.

The process tracker 135 also provides for the ability to track which tasks were presented to users so that an auditing process for operators completing data entry does not need to process whether missing data from a non-presented tasks need to be treated as operator error. For example, if a client has no guardian information associated with the client's records, this will be treated as operator error when the request was presented to the operator, but not when the request was not presented to the operator (e.g., when the process tracker 135 determined that the client has no need of a guardian).

In various aspects, the process tracker 135 includes functionality in the UI for the user to manually note erroneously presented UI elements and for presented tasks controls to be automatically marked as un-presented when a condition that caused the tasks to be presented is withdrawn. For example, when a user inputs a birthdate for the client with a typographical error that indicates that the client is a minor (but in reality is not) and fixes the typographical error, a dialog for guardian information may initially be included in the UI (based on the condition of the clients age) and then withdrawn in response to the corrected birthdate, in which case the process tracker 135 will treat the task as not having been presented to the operator for purposes of auditing. Similarly, UI elements may include an option for users to manually clear a task, such as, for example, when a client does not have the requested information (or will not provide it). A manually cleared task may be marked with a tag (e.g., 'no data', 'delay for later collection') by the workflow system 130 to differentiate tasks that have been manually cleared (and/or a reason for manually clearing the task) from tasks that have not been addressed yet and/or forgotten.

The one or more external respository(ies) 140 include computer devices and computer readable storage media accessible via the workflow system 130 that are controlled by the party providing the workflow system 130 or by a third party. In various aspects, the external repositories 140 include the internal repositories 120 of other institutions that have agreed to share data (e.g., a referring office from a different institution, a remote or satellite office within an institution, a public or governmental institution) as well as the databases and servers controlled by the workflow system 130 to provide services to the institution. Data held in the external repositories 140 are used by the workflow system 130 to provide the historical data that allow for process tracking with reduced computing resources needed for an auditing process during a procedure or after the procedure.

Communications between the various components of FIG. 1 may done via structured communications. For example, if the institution were a medical institution, structured communications may include documents formatted according to the HL7 standard (e.g., admission/discharge/transfer (ADT) communications, schedule information unsolicited (SIU) communications, or A04 transmission for intake, A08 transmission for updates) or an electronic data interchange (EDI) transaction (e.g., EDI-270 requests or EDI-271 responses). These communications may be encrypted or unencrypted in addition to any encryption used over a communications channel (e.g., a VPN). For example, communications between the workstation 110 and the internal repository 120 may be unencrypted, but communications between the internal repository 120 and the workflow system 130 may be encrypted. One of ordinary skill in the art will be familiar with potential algorithms to apply to encrypt the communications.

Figure 2A:
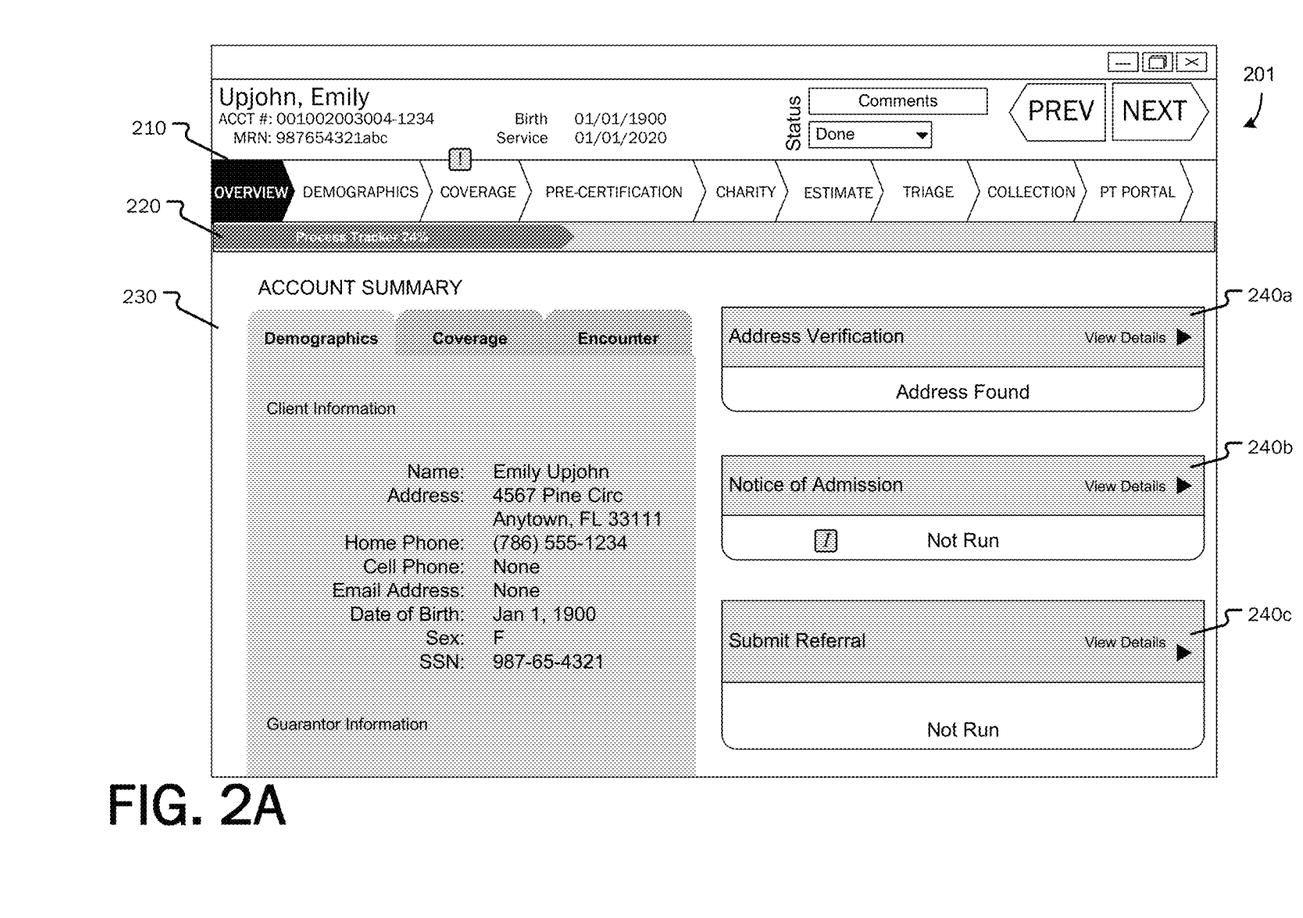
FIGS. 2A-2C are example user interfaces for tracking the process of a client activity.

FIG. 2A is an example UI 201 tracking the process of a client activity. Via the UI 201, the user is enabled to enter data regarding a client, view data regarding the client, and track the process of the client through the activity. The UI 201 is generated and transmitted by the workflow system 130 to the user workstation 110, and although various controls and displays are shown and discussed in relation to FIG. 2A, one of skill in the art will recognize that some illustrated elements are not discussed and that additional elements, and arrangements thereof, are also possible; the elements discussed herein are provided as non-limiting examples. As will be appreciated, the UI 201 and the elements thereof are generated and updated by the cloud-based system (e.g., workflow system 130).

The dashboard UI 201 includes an information display area 230 that includes information regarding a given client activity, the current phase or status of processing, and navigation controls 210, operable to move the dashboard UI 201 to different phases of processing and/or to different client activities. In various aspects, the navigation controls 210 include directional buttons (e.g., Previous or Next) for navigating to a previous/next patient or a previous/next phase in an ordered list of patients or phases. In other aspects, the navigation controls 210 include tabs, displaying all (or a displayable subset) of the available client activities or phases, from which a user may select. In yet other aspects, a search feature will be included with the navigation controls 210 so that a user may type all or a portion of a name for a client or phase and navigate to that client's activity or phase. As will be appreciated, the navigation controls 210 may be implemented to limit navigation based on context. For example, in a first phase of an ordered list of phases, a "Previous" navigation control will not be provided, not be selectable, or will be "grayed out."

As illustrated, a process indicator 220 is provided in the UI 201 to indicate to a user how far along the tasks related to a client activity are in process. As will be appreciated, a client activity may be completed or closed out independently of the tasks that are related to it. For example, a client activity may last for a predetermined length of time (e.g., a half hour appointment) and a portion of the related tasks may be left incomplete after the client activity has ended. In another example, a client activity may be closed out as completed when a designated task is marked as complete, such as "provide the check," may mark the end of a client activity in a restaurant, even if the "ask client about dessert" task has not been completed. In yet another example, a client activity may be incomplete, but all of the related tasks may be completed, such as, all the steps for a car's oil change have been completed, but the driver has not picked up the vehicle. The process indicator 220 therefore displays a percentage for the collective competition of the tasks comprising a client activity independently from the completion of the client activity.

As illustrated, the collective completion of the tasks is displayed as a percentage and a status bar (reflective of that percentage in relative area of the process indicator) and the percentage is determined based on the number of tasks that were both presented to the user and determined to have been completed for a given client activity (as a numerator value) against the total number of tasks presented to the user (the sum of tasks presented and completed, presented and in progress, presented and not started, presented and completed but with an alert as a denominator). The completion status of the client activity may simultaneously be displayed in the process indicator 220 via color cues of the progress bar and/or the background. For example, a client activity that is still in process may have a progress bar (or background) of an associated process indicator 220 that is a first color (e.g., green, blue), whereas a client activity that is complete may have a progress bar (or background) of an associated process indicator 220 that is a second color (e.g., red, yellow).

The status of the tasks used in calculating the percentage of tasks completed for a given client activity will be known to the cloud-based system that generates the UI in which the process indicator 220 is displayed without the need for the system to receive additional data or requiring user interaction. The data that the user has inputted, or that the cloud-based system has access to from historic data, are used to automatically update the statuses of various tasks and client activities. For example, as data are received, the cloud-based system will run various transactions on those data (e.g., verifying consistency of the input data to historic data, querying external systems to validate the input data) and will track which of the tasks have been presented to the users and which tasks have been completed by the users to automatically update the process indicator 220 without requiring further transmissions or user input.

Also illustrated in the information display area 230 are various task summary controls 240a-c (collectively, task summary controls 240). Each task summary control 240 is related to a single task or grouping of tasks, and may be optimized for display in the UI 201 by the could-based system based on historical user data. For example, the third task summary control 240c is illustrated as larger than the other task summary controls 240 in the display area to prioritize its display, which may be based on historical user data indicating that the user has previously failed to complete the associated task. Tasks may be prioritized (or deprecated) for display in the UI 201 based on historical user data in various aspects by changing a relative size of an associated task summary control 240, an order of the task summary controls 240, a color of an associated tasks summary control 240, applying/removing animation effects (e.g., flashing, blinking, strobing, bouncing, pulsing) to a task summary control 240, applying/removing an icon indicating the task's importance, or including the tasks as a dialog in the UI 201.

Figure 2B:
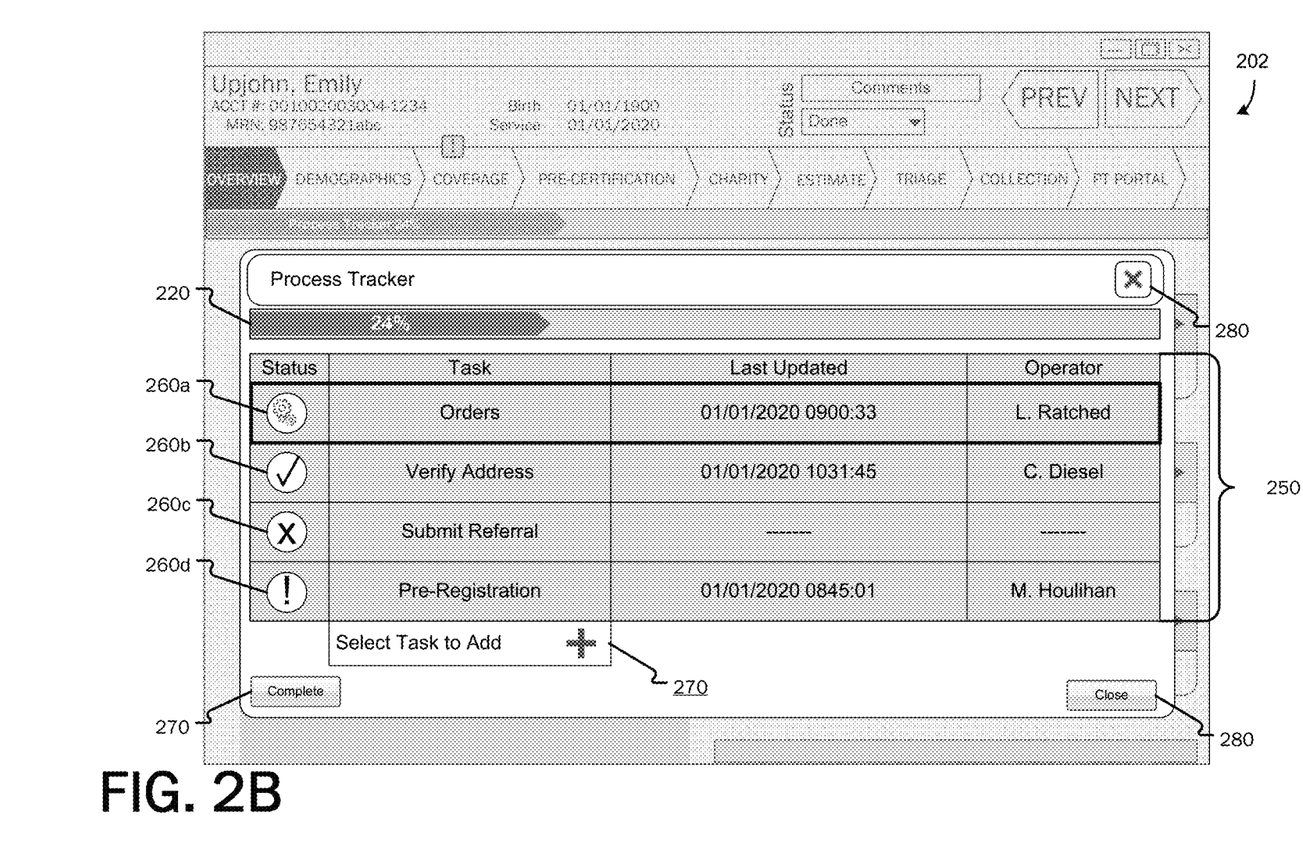

FIG. 2B is an example dialog 202 in a UI 201 tracking the process of a client activity. Via the dialog 202, which may be modal or non-modal, the user is provided additional detail on the process of the client activity. The dialog 202 is generated and transmitted by the workflow system 130 to the user workstation 110, and various controls and displays are shown and discussed in relation to FIG. 2B, although one of skill in the art will recognize that some illustrated elements are not discussed and that additional elements, and arrangements thereof, are also possible; the elements discussed herein are provided as non-limiting examples.

As illustrated, the dialog 202 includes a process indicator 220, which displays the collective completion of the tasks that comprise a client activity, as discussed in regard to FIG. 2A, as well as a task summary table 250, showing details related to the tasks. For example, a status, name, update time, and responsible/last known user may be displayed for each task related to a client activity. The status of the tasks may be summarized via task status indicators 260, such as in-progress task status indicators 260a, a completed task status indicator 260b, a not started task status indicator 260c, or an alert state task status indicator 260d. One of skill in the art will appreciate that the illustrated task status indicators 260 are presented as non-limiting examples and that more or fewer categories with different presentations may be provided in other aspects.

Manual task controls 270 are provided in the dialog 202 for the users to add tasks, acknowledge tasks, mark tasks as complete, mark tasks as incomplete, change responsible users for a given task (i.e., to reassign a task), edit data inputted for a task, clear alerts, to add a new task to the client activity, to remove a task from the client activity, etc., to provide control of individual tasks and the client activity. Manual task controls 270 may be provided or not provided based on the context of a selected task in the task summary table 250. For example, a manual task control 270 may be provided to mark an in progress task as complete based on its status, but a manual task control 270 to mark the same task as incomplete may be omitted based on its current status of not being complete.

The dialog 202 also includes various dialog controls 280 to affect or acknowledge the data presented in the dialog 202. For example, buttons to close without applying changes, close and apply changes, apply changes without closing, to maximize, minimize, or transfer the dialog 202 to another screen may be provided.

Figure 2C:
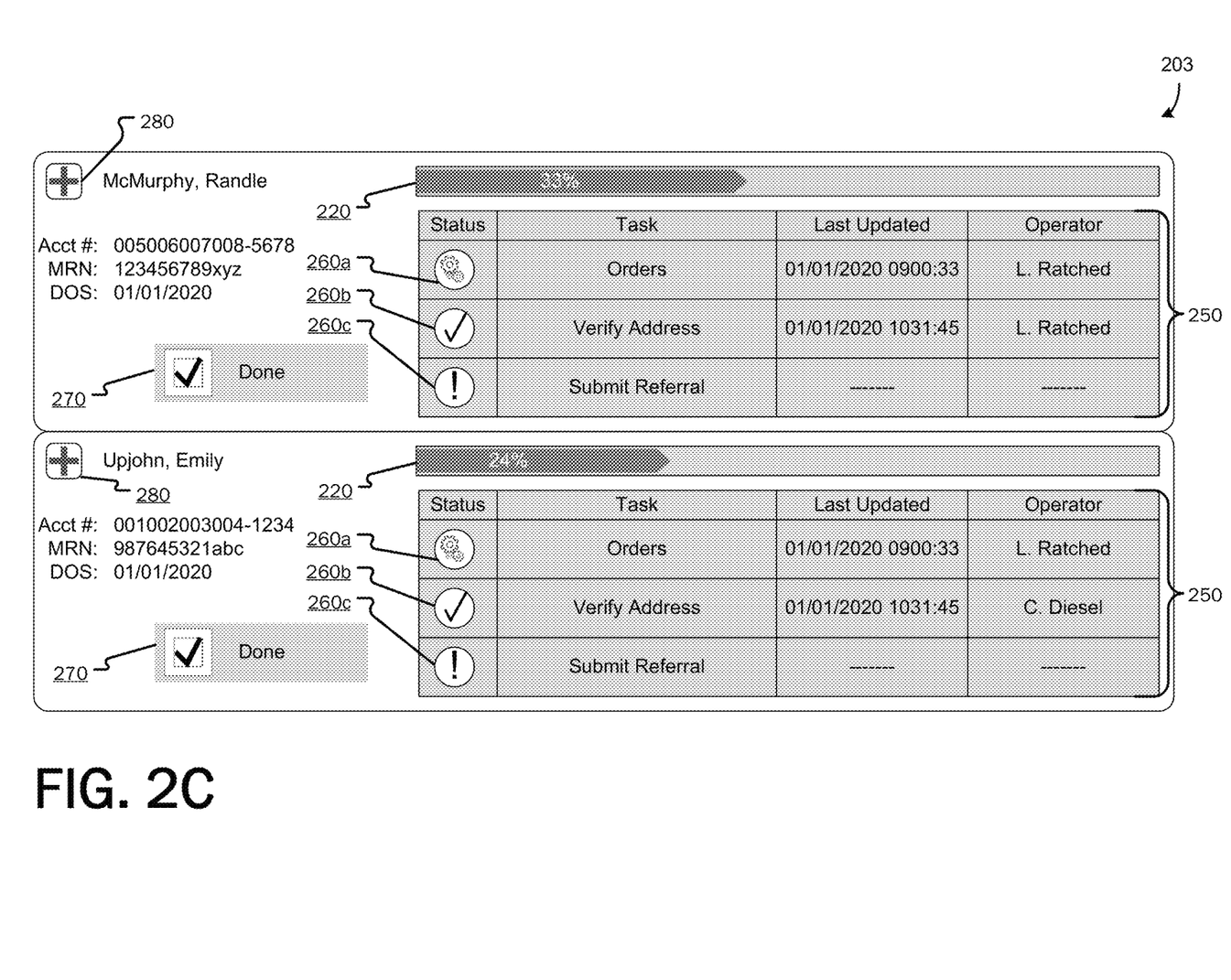

FIG. 2C is an example tracking UI 203 tracking multiple client activities. As will be appreciated, when multiple client activities are shown, they may be shown as dialogs within a different UI or as a separate UI, and may be grouped by client activity type, time period, users, or clients. In various aspects, when a user requests a report, the tracking UI 203 will be displayed. For example, when requesting a report on a given type of client activity, all of the client activities, and a summary thereof, will be displayed in the tracking UI 203. In another example, when requesting a user efficacy report for a given user, a tracking UI 203 will display the client activities which the user is associated with and the tracking UI 203 will be organized accordingly and may include a summary of how well the user has completed tasks for client activities that are marked as completed in the cloud-based system.

Figure 3:
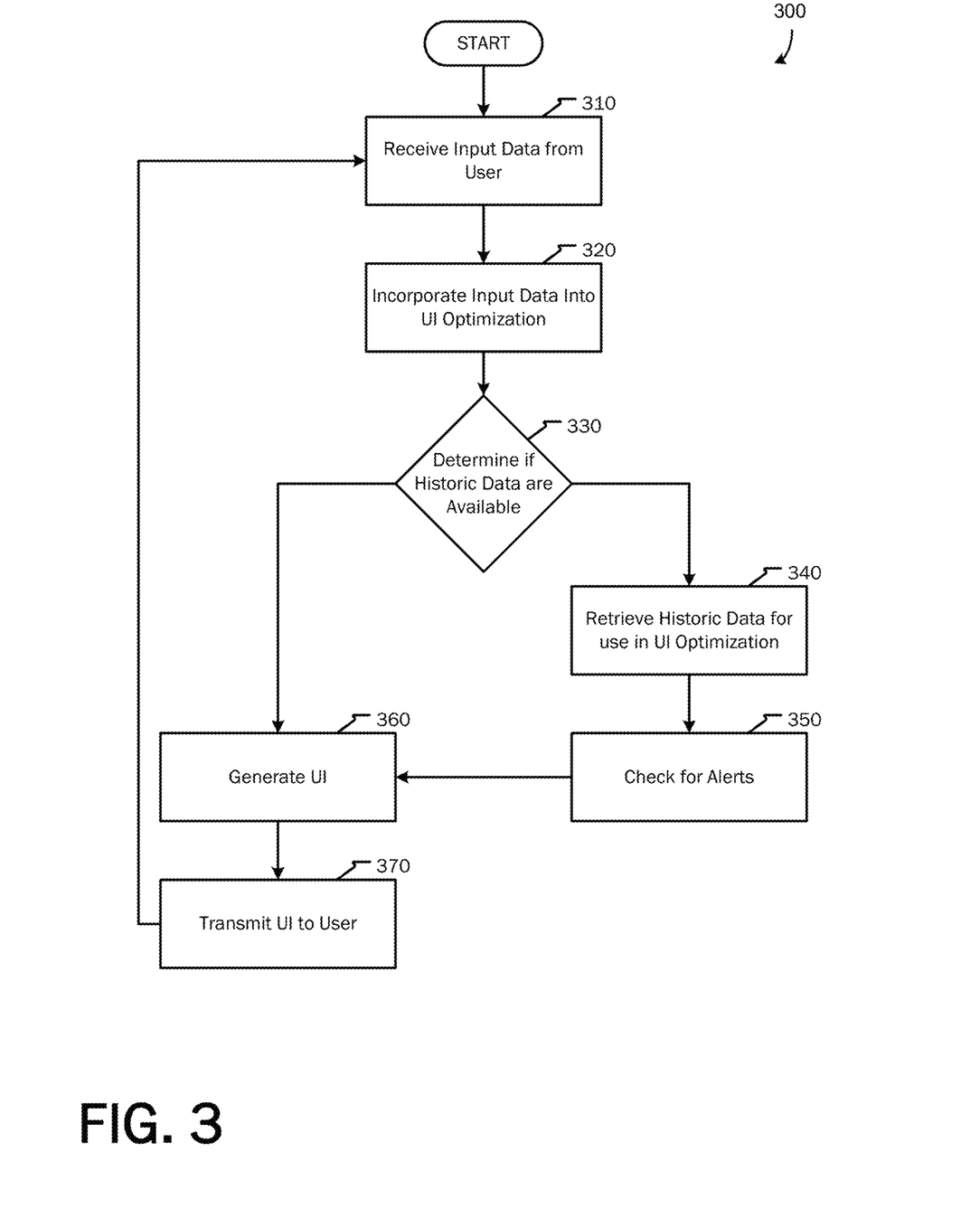
FIG. 3 is a flow chart showing general stages involved in an example method for tracking the process of a client activity.

FIG. 3 is a flow chart showing general stages involved in an example method 300 for tracking the process of a client activity via component tasks. Method 300 begins at OPERATION 310, where input data are received from the user by the cloud-based system used for process tracking. In various aspects, the initial input data include a name (or other Personally Identifiable Information (PII)) regarding the client, a name or category of the client activity, and may include a user identifier or the identity of the user may be known to the cloud-based system based on a login to the system (e.g., stored in a cookie, a token, correlated with a user workstation 110 address (e.g., a machine access code (MAC) address, an internet protocol (IP) address).

Method 300 proceeds to OPERATION 320, where the input data are incorporated into the optimization of the UI. The input data are used to determine which tasks are related to the client activity so that their associated UI elements may be presented to the user. The related tasks are sub-activities to the client activity, for example, input data that specify a client activity of "oil change" will indicate tasks of "drain oil," "replace oil cap," "change oil filter," and "add new oil," whereas input data that specify a client activity of "colonoscopy" would specify different tasks (related to performing a colonoscopy). The plurality of tasks that are determined by the cloud-based system to be related to the client activity may be defined by the institution, and influenced by the input data for presenting or not presenting optional tasks. For example, an institution may define a client activity for "student registration" that will include different optional tasks depending on the grade or age of the student. For example, all students may be presented with the task of "select class schedule," but only students who have input an age over fifteen in their input data are presented the optional task of "verify desire for parking permit." Similarly, users who inputted a first response to a branching task may be presented with additional or different subsequent tasks than users who inputted a second response. For example, users who responded positively the task of "verify desire for parking permit," may be presented with a task of "provide license and vehicle information" whereas users who responded negatively may not be presented the task of "provide license and vehicle information." One of ordinary skill in the art will appreciate that other client activities with different associated tasks than the above examples are possible and that the above examples are non-limiting.

Method 300 then proceeds to DECISION 330 to determine whether historic data are available. As will be appreciated, historic data fall into two categories: historical client data, which are related to previous data regarding the client known to the institution, the workflow system 130, or outside parties; and historical user data, which are related to the past performance and roles of the user. For example, historical client data may include input data from a previous client activity, the results of validations previously performed by the cloud-base system, etc. As will also be appreciated, when the process tracking is first activated, or in the event of limited network connectivity, the historic data may not be available. If historic data are available based on the input data, method 300 proceeds to OPERATION 340, otherwise method 300 proceeds to OPERATION 360.

At OPERATION 340, historic data are retrieved by the cloud-based system from various repositories based on the input data. The historic data are retrieved from internal repositories 120 and external repositories 140 based on matching information from the input data to the records stored in the repositories. For example, based on a client name submitted with the input data, previous client activities related to the current client stored by the repositories will be retrieved, so that when additional input data are submitted, they may be checked at OPERATION 350 for consistency between entries. In another example, a user role or user history is retrieved based on a matching user identity so that the user will only be presented with tasks within a given user role or so that tasks that the user has historically not completed by the conclusion of the client activity may be prioritized in the UI so that the user does not forget to complete those tasks. Historical user data include data regarding an individual user and how that user has performed in process tracking, as well as data aggregated for all users within a given class or role within the institution. For example, a given technician at a hospital may be noted by individual historical user data as often failing to complete a given task, or the technicians in general may be noted as often failing to complete the given task so that the UI may be optimized to prioritize the given task to ensure that it is completed.

Proceeding to OPERATION 350, the cloud-based system determines, based on a comparison between and within the input data and the historical client data, whether to include any alerts in the generation of the UI. For example, when the input data include a data field (e.g., a client address) that is also included in the historical client data (e.g., a previously entered client address) that does not match the historical client data, an alert may be generated. In another example, when the input data include data fields that are mutually exclusive or do not match the client activity (e.g., input data for a client over the age of majority includes guardian information, a client noted as male is scheduled for a client activity limited to female clients) an alert may be generated. In yet another example, when historical client data include inconsistent information (e.g., multiple addresses), an alert may be generated. Alerts are provided to draw the user's attention to a particular data element, and in various aspects may require the user to clear or acknowledge the alert before the user is permitted to continue processing the client.

At OPERATION 360, a UI is generated by the cloud-based system for display on the user workstation 110. As will be appreciated a base UI may be provided to the user to prompt the user to input the initial input data, but as input data are received and historic data are retrieved, the base UI may be replaced or updated with a customized layout that is optimized to the client activity and to the user.

To optimize the UIs, the historical user data are used to prioritize or deprecate tasks that are to be displayed to the user as part of the client activity. For example, if a user has historically left a given task incomplete, that task may be prioritized in the UI over unprioritized tasks such that it is shown as larger than tasks of lower priority, shown earlier in a sequence of tasks than tasks of lower priority (e.g., higher in a vertical list of tasks in the UI, leftward in a horizontal list of tasks in the UI), with a different color, with an animation effect (e.g., flashing, blinking, strobing, bouncing, pulsing), or with an icon indicating its importance. Deprecating a task may involve removing the features added to prioritize the task in the UI (e.g., color, animation, position, inclusion of an icon, increased size, dialog windows) or applying further features, such that it is shown as smaller than tasks of higher priority, shown later in a sequence of tasks than tasks of higher priority, or with a different color. As users complete tasks, those tasks may be deprioritized (i.e., deprecated), and their prominence in the UI lessened. For example, a completed task may be moved in the display of the UI from its initial position to behind the last uncompleted task in a customized order (e.g., the last task in the sequence of the client activity, the task least likely to be left incomplete by the user) or shrunk in the UI so that the next highest priority tasks may grow in size within a given display area of the UI.

At OPERATION 370 the UI is transmitted to the user from the cloud-based system and method 300 returns to OPERATION 310, where the user may input additional input information, leading to the updating and further optimization of the UI, or the conclusion of method 300.

Figure 4:
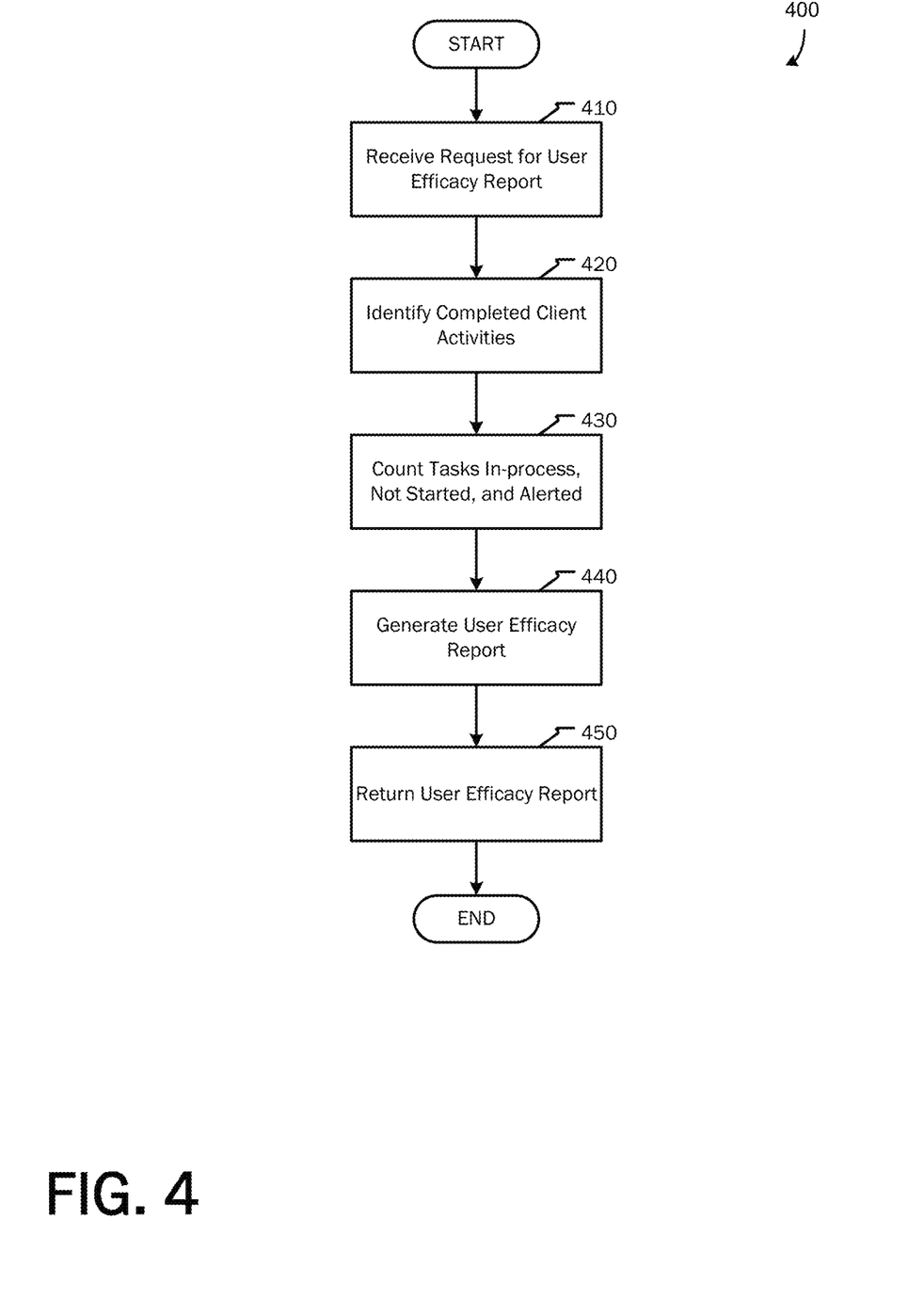
FIG. 4 is a flow chart showing general stages involved in an example method for determining how an operator has performed historically regarding process tracking.

FIG. 4 is a flow chart showing general stages involved in an example method 400 for determining how an operator has performed historically regarding process tracking. Method 400 begins at OPERATION 410, where the cloud-based system receives a request for a user efficacy report. In various aspects, the request specifies one or more users on whom the efficacy report will be generated as well as time ranges (e.g., $date_1$ to $date_2$, the last n months) from which to gather historical user data and specific client activities or tasks to examine or ignore. As will be appreciated, the request may be made by the user or by a different user (e.g., a supervisor), and the cloud-based system may limit access to user efficacy reports to certain individuals based on policies set by the institution.

Proceeding to OPERATION 420, the cloud-based system identifies the client activities that have been completed. As will be appreciated, a client activity may be marked as completed even when not all of the related tasks are completed. For example, a client activity related to an emergency room visit may be completed when a patient leaves the emergency room, regardless of whether the tasks for intaking client information were completed. Continuing the example, the patient may be rushed to the emergency room, and tasks for "schedule room," "triage," "assign physician," "determine blood type," and "treat patient" may be completed, but tasks for "reach out to emergency contact persons," "contact chaplain," and "identify patient" may be skipped or left incomplete at the time that the patient leaves the facility. Therefore, at OPERATION 430 the cloud-based system will tally the tasks related to completed client activities that have been presented to the user but are incomplete, that is, those task that have additional statuses of "in-process," "not started," or that are complete but associated with an alert.

In various aspects, the institution may indicate some alerts that, if associated with a completed task, will cause that task to be included (or excluded) from the tally of incomplete tasks made in OPERATION 430. For example, continuing the emergency room illustration above, a user who intakes the patient may input a placeholder name of "John Doe" for an unresponsive patient, which completes the task, but results in two example alerts. The first alert indicates that the name "John Doe" is recognized as a placeholder name (e.g., "John Doe," "Jane Roe"), and although it satisfies the terms of a task for name input, it is unlikely to be the patient's actual name, and is therefore tracked with a status of "completed but associated with an alert", and may be tallied with incomplete tasks. The second alert indicates that the input given name of "John" might be short for "Johnathan," but would not result (on its own) in a status of "completed but associated with an alert" that would cause the task to be tallied with incomplete tasks. Instead, the second alert is excluded from causing the completed task from being counted in the tally because a patient's given name may actually be "John," and the alert is only provided to ensure the user verifies the correct given name (e.g., that is not a nickname) is input for the patient. Institutions may specify various alerts that cause a completed task to be counted (or not counted) with the tallied incomplete tasks, and the above is provided as a non-limiting example.

Method 400 then proceeds to OPERATION 440, where the user efficacy report is generated. As will be appreciated, the report may be formatted according to various styles and document types or may be included in a UI generated by the cloud-based system. At OPERATION 450, the user efficacy report is transmitted from the cloud-based system to the requestor, and method 400 concludes.

Figure 5:
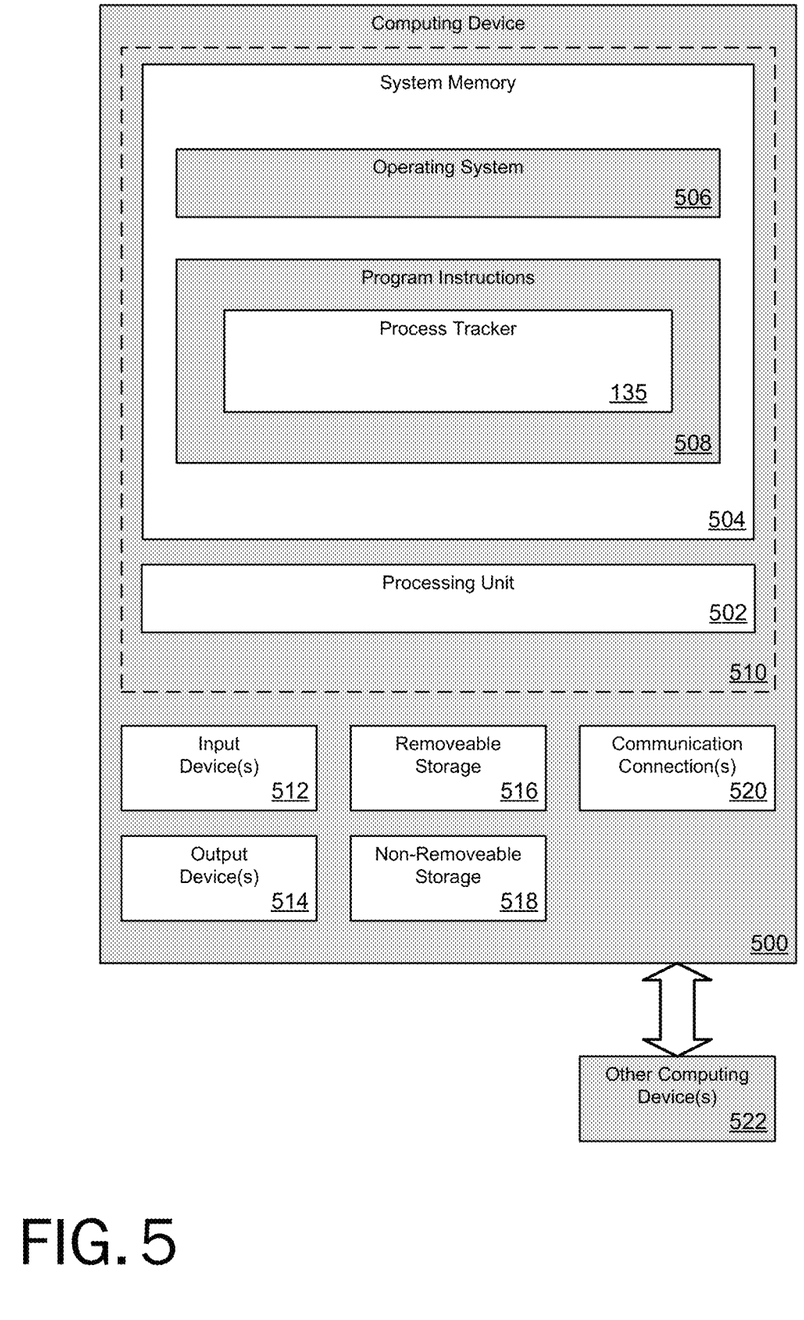
FIG. 5 is a block diagram illustrating physical components of an example computing device with which aspects may be practiced.

FIG. 5 is a block diagram illustrating physical components of an example computing device with which aspects may be practiced. The computing device 500 may include at least one processing unit 502 and a system memory 504. The system memory 504 may comprise, but is not limited to, volatile (e.g. random access memory (RAM)), non-volatile (e.g. read-only memory (ROM)), flash memory, or any combination thereof. System memory 504 may include operating system 506, one or more program instructions 508, and may include sufficient computer-executable instructions for a process tracker 135, which when executed, perform functionalities as described herein. Operating system 506, for example, may be suitable for controlling the operation of computing device 500. Furthermore, aspects may be practiced in conjunction with a graphics library, other operating systems, or any other application program and is not limited to any particular application or system. This basic configuration is illustrated by those components within a dashed line 510. Computing device 500 may also include one or more input device(s) 512 (keyboard, mouse, pen, touch input device, etc.) and one or more output device(s) 514 (e.g., display, speakers, a printer, etc.).

The computing device 500 may also include additional data storage devices (removable or non-removable) such as, for example, magnetic disks, optical disks, or tape. Such additional storage is illustrated by a removable storage 516 and a non-removable storage 518. Computing device 500 may also contain a communication connection 520 that may allow computing device 500 to communicate with other computing devices 522, such as over a network in a distributed computing environment, for example, an intranet or the Internet. Communication connection 520 is one example of a communication medium, via which computer-readable transmission media (i.e., signals) may be propagated.

Programming modules, may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 500 or any other computing devices 522, in combination with computing device 500, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A cloud-based system to generate an optimized user interface with improved efficiency relating to a client activity, comprising:
    a processor; and
    a computer readable memory storage device, including instructions, which when executed by the processor are operable to enable the cloud-based system to:
        receive input data from a user regarding a client and the client activity from a remote computer work station;
        determine a plurality of tasks that are related to the client activity based on the input data received from the remote computer work station;
        retrieve historical client data that corresponds to results of validations previously performed by the cloud-based system for the client from a repository based on the input data received from the remote computer work station;
        determine which of the plurality of tasks to prompt the user to provide additional input data based on the historical client data that corresponds to the results of the validations previously performed by the cloud-based system for the client and the input data received from the remote computer work station;
        generate one or more alerts to populate the optimized user interface if the input data of a data field does not match the historical client data;
        retrieve historical user data that corresponds with past performance and one or more roles of the user from a repository based on the input data received from the remote computer work station;
        determine a customized order in which to present the plurality of tasks to prompt the user for the additional input data, wherein the customized order prioritizes tasks for the user to supply the additional input data based on the historical user data that corresponds with the past performance and the one or more roles of the user;
        generate the optimized user interface to display:
            the plurality of tasks including any alerts organized in a first display portion of the optimized user interface according to the customized order in which to prompt the user for the additional input data; and
            a process indicator in a second display portion of the optimized user interface that provides a visual indication corresponding to how far to completion of the plurality of the tasks related to the client activity determined in part by tasks presented to the user and completed with any alerts;
        transmit the optimized user interface to the remote computer work station; and
        in response to receiving the additional input data from the remote computer work station for a given task, modify the display of one or more of the plurality of tasks in the optimized user interface and update the process indicator.

2. The system of claim 1, wherein the input data and the additional input data regarding the client are compared against the historical client data, and the cloud-based system inserts alerts into the optimized user interface indicating mismatches between the input data and the additional input data regarding the client and the historical client data.

3. The system of claim 1, wherein the instructions are further operable to enable the cloud-based system to:
    track a status of the client activity by tracking statuses of tasks, wherein the statuses of tasks are chosen from among:
        not presented;
        presented and not started;
        presented and in-progress;
        presented and complete; and
        presented and alert; and
    update the process indicator displayed with the optimized user interface to indicate how far along in process the plurality of tasks related to the client activity according to a number of tasks presented to the user and completed for the client activity divided by a sum of: the number of the tasks presented to the user and completed, a number of the tasks presented to the user and in progress, a number of the tasks presented to the user and not started, and a number of the tasks presented to the user and completed with an alert.

4. The system of claim 3, further to:
    determine when the given task has statuses of presented and complete; and
    update the optimized user interface to deprecate a prominence of the given task, wherein to deprecate the prominence includes a removal of one or more features added to convey priority for the given task.

5. The system of claim 4, wherein to deprecate the prominence of the given task includes at least one of:
    moves the given task behind a last uncompleted task in the customized order;
    changes a color of the given task in the optimized user interface;
    removes an icon from the given task in the optimized user interface;
    decreases a size of the given task in the optimized user interface; and
    closes a dialog window associated with the given task in the optimized user interface.

6. The system of claim 1, wherein the tasks prioritized for presentation in the optimized user interface comprise a subset of tasks comprising the client activity, wherein the subset of tasks are based on historical user data indicating a role of the user, and wherein tasks comprising the client activity that are not part of the subset are prioritized for display to a different user based on historical user data indicating a different role for the different user.

7. The system of claim 1, further to:
    receive a request for a user efficacy report, including an identity of the user;
    identify a number of tracked tasks, including completed and incomplete tasks, that belong to completed client activities and have been presented to the user;
    tally the tracked tasks having statuses of:
        in-process;
        not started;
        completed but associated with an alert;
    generate the user efficacy report based on the tracked tasks that were tallied compared to the number tracked tasks; and
    transmit the user efficacy report.

8. A method for improving efficiency of a cloud-based system in generating an optimized user interface relating to a client activity to transmit to a remote computer work station, comprising:
- receiving, at the could-based system, input data from the remote computer work station regarding a client and the client activity;
- determining, by the cloud-based system, a plurality of tasks that are related to the client activity based on the input data received from the remote computer work station;
- retrieving, by the cloud-based system, historical client data that corresponds to results of validations previously performed by the cloud-based system for the client from a repository based on the input data received from the remote computer work station;
- determining, by the cloud-based system which of the plurality of tasks to prompt a user to provide additional input data based on the historical client data that corresponds to the results of the validations previously performed by the cloud-based system for the client and the input data received from the remote computer work station;
- generating one or more alerts to populate the optimized user interface if the input data of a data field does not match the historical client data;
- retrieving, by the cloud-based system, historical user data that corresponds with past performance and one or more roles of the user from a repository based on the input data received from the remote computer work station;
- determining, by the cloud-based system, a customized order in which to present the plurality of tasks in the optimized user interface to prompt the user for the additional input data, wherein the customized order prioritizes tasks for the user to supply the additional input data based on the historical user data that corresponds with the past performance and the one or more roles of the user;
- generating the optimized user interface to display:
  - the plurality of tasks including any alerts organized in a first display portion of the optimized user interface according to the customized order in which to prompt the user for the additional input data; and
  - a process indicator in a second display portion of the optimized user interface that provides a visual indication corresponding to how far to completion of the plurality of the tasks related to the client activity determined in part by tasks presented to the user and completed with any alerts;
- transmitting the optimized user interface to the remote computer work station;
- tracking statuses of the tasks; and
- in response to receiving the additional input data from the remote computer work station for a given task, modify the display of one or more of the plurality of tasks in the optimized user interface and update the process indicator.

9. The method of claim 8, wherein the input data and the additional input data are extracted from structured communications transmitted to the cloud-based system from the remote computer work station.

10. The method of claim 8, wherein the input data and the additional input data regarding the client are compared against the historical client data and the cloud-based system inserts verification tasks into the optimized user interface in response to mismatches between the input data and the additional input data regarding the client and the historical client data.

11. The method of claim 8, wherein tracking the status of the tasks further comprises:
- determining, by the cloud-based system, when the given task is complete; and
- in response to determining that the given task is complete, updating the customized order to deprecate a prominence of the given task.

12. The method of claim 11, wherein deprecating the prominence of the given task further includes at least one of:
- moving the given task behind a last uncompleted task in the customized order;
- changing a color of the given task in the optimized user interface;
- removing an icon from the given task in the optimized user interface;
- decreasing a size of the given task in the optimized user interface; and
- closing a dialog window associated with the given task in the optimized user interface.

13. The method of claim 8, wherein the tasks prioritized for presentation in the optimized user interface comprise a subset of tasks comprising the client activity, wherein the subset of tasks are based on historical user data indicating a role of the user.

14. The method of claim 13, wherein tasks comprising the client activity that are not part of the subset are prioritized for display to a different user based on historical user data indicating a different role for the different user.

15. The method of claim 8, wherein tracking statuses of tasks further comprises:
- determining a status for each task from among:
  - not presented;
  - presented and not started;
  - presented and in-progress;
  - presented and complete; and
  - presented and alert; and
- updating the optimized user interface with the status of the client activity as a percentage of the tasks that have the statuses of presented and complete out of a number of the tasks that have the statuses of presented and not started, presented and in-progress, presented and complete, and presented and alert.

16. The method of claim 8, wherein the cloud-based system is further operable to use the historical user data to produce an efficacy report regarding the user.

17. The method of claim 16, further comprising:
- receiving, at the cloud-based system, a request for the efficacy report, identifying the user;
- identifying, by the cloud-based system, completed client activities that have been presented to the user;
- tallying, by the cloud-based system, tracked tasks from the completed client activities that have been presented to the user having statuses of:
  - completed without an alert;
  - in-process;
  - not started; and
  - completed with an alert;
- generating, by the cloud-based system, the efficacy report based on the tracked tasks that were tallied; and
- transmitting the efficacy report from the cloud-based system to the remote computer work station.

18. A system for improving efficiency of a cloud-based system to generate an optimized user interface relating to a client activity, comprising:

a remote user workstation, operable to provide input data from a user regarding a client and the client activity, comprising a plurality of tasks;

a repository, operable to store historical client data that corresponds to results of validations previously performed by the cloud-based system for the client and historical user data that corresponds with past performance and one or more roles of the user; and a workflow system, in communication with the remote user workstation and the repository, operable to generate optimized user interfaces for display on the remote user workstation based on the input data received from the remote computer work station and the historical client data that corresponds to the results of the validations previously performed by the cloud-based system for the client used to generate one or more alerts to populate the optimized user interface if the input data of a data field does not match the historical client data, and including:

a process tracker, operable to generate the optimized user interface based on the historical user data that corresponds with the past performance and the one or more roles of the user to display:

the plurality of tasks including any alerts organized in a first display portion of the optimized user interface according to a customized order in which to prompt the user for the additional input data; and a process indicator in a second display portion of the optimized user interface that provides a visual indication corresponding to how far to completion of the plurality of the tasks related to the client activity determined in part by tasks presented to the user and completed with any alerts, wherein the customized order prioritizes tasks for the user to supply the additional input data based on the historical user data that corresponds with the past performance and the one or more roles of the user.

19. The system of claim 18, wherein the process tracker is further operable to:

receive a request for a user efficacy report, including an identity of the user;

identify a number of tracked tasks that belong to completed client activities and have been presented to the user;

tally the tracked having statuses of:
  completed;
  in-process;
  not started; and
  alerted;

generate the user efficacy report based on the tracked tasks that were tallied having a status of completed out of a total number of tracked tasks; and transmit the user efficacy report to the remote user workstation.

20. The system of claim 18, further comprising an internal repository, operable to provide centralized management of records within an institution to which the remote user workstation belongs.

* * * * *